(12) United States Patent
Nakatsuka (10) Patent No.: US 10,151,911 B2
(45) Date of Patent: Dec. 11, 2018

(54) MICROSCOPE SYSTEM AND METHOD FOR ESTIMATING MICROSCOPE MAGNIFICATION

(71) Applicant: OLYMPUS CORPORATION, Tokyo (JP)

(72) Inventor: Masayuki Nakatsuka, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 84 days.

(21) Appl. No.: 15/386,105

(22) Filed: Dec. 21, 2016

(65) Prior Publication Data

US 2017/0205616 A1 Jul. 20, 2017

(30) Foreign Application Priority Data

Jan. 15, 2016 (JP) ................................ 2016-006398

(51) Int. Cl.
*G02B 21/36* (2006.01)
*G02B 21/02* (2006.01)
(Continued)

(52) U.S. Cl.
CPC ......... *G02B 21/365* (2013.01); *G02B 21/025* (2013.01); *G02B 21/248* (2013.01);
(Continued)

(58) Field of Classification Search
None
See application file for complete search history.

(56) References Cited

U.S. PATENT DOCUMENTS

| 2009/0087177 A1* | 4/2009 | Uchida | ................ G02B 21/365 396/432 |
| 2014/0210972 A1* | 7/2014 | On | ........................ G02B 7/36 348/65 |

FOREIGN PATENT DOCUMENTS

| EP | 1 394 739 A1 | 3/2004 |
| EP | 2 051 122 A1 | 4/2009 |

(Continued)

OTHER PUBLICATIONS

Extended European Search Report dated May 3, 2017 in European Patent Application No. 16 19 5752.7.

*Primary Examiner* — Christopher G Findley
(74) *Attorney, Agent, or Firm* — Scully, Scott, Murphy & Presser, P.C.

(57) ABSTRACT

Provided is a microscope system including: a microscope that includes an optical member disposed in an optical path so as to be switchable and that acquires an image of a specimen; and a processor including hardware, wherein the processor is configured to implement: a magnification-estimation unit that, on the basis of a pre-switching optical magnification of the optical member in the microscope, is configured to estimate a post-switching optical magnification, wherein while scaling one of a pre-switching image acquired before switching of the optical member and a post-switching image acquired after switching of the optical member to a plurality of search images respectively corresponding to a plurality of search magnifications, the magnification-estimation unit is configured to calculate a degree of similarity to the other image and estimates the post-switching optical magnification from the search magnification when the calculated degree of similarity becomes the maximum.

6 Claims, 5 Drawing Sheets

(51) Int. Cl.
*G02B 21/24* (2006.01)
*G02B 21/26* (2006.01)

(52) U.S. Cl.
CPC ........... *G02B 21/26* (2013.01); *G02B 21/361* (2013.01); *G02B 21/362* (2013.01); *G02B 21/367* (2013.01)

(56) References Cited

FOREIGN PATENT DOCUMENTS

| | | |
|---|---|---|
| EP | 2 767 857 A1 | 8/2014 |
| JP | 2009-086314 A | 4/2009 |
| JP | 2013-101314 A | 5/2013 |

\* cited by examiner

MICROSCOPE SYSTEM AND METHOD FOR ESTIMATING MICROSCOPE MAGNIFICATION

CROSS-REFERENCE TO RELATED APPLICATIONS

This application claims the benefit of Japanese Patent Application No. 2016-006398, the content of which is incorporated herein by reference.

TECHNICAL FIELD

The present invention relates to a microscope system and a method for estimating a microscope magnification.

BACKGROUND ART

In order to visually perceive the size of an object of interest from an observation image acquired in a microscope, some conventional microscopes are provided with a function for superimposing a scale on the display screen on which the acquired image is displayed and a function for measuring the distance between two points on the display screen.

There is also a known microscope that, because the magnification of the observation image is changed when the objective lens is switched using a revolver provided in the microscope, detects the switching of the objective lens from the acquired image and reports the switching so that the magnification information is changed (refer to, for example, Patent Literature 1).

CITATION LIST

Patent Literature

{PTL 1}
Japanese Unexamined Patent Application, Publication No. 2009-86314

SUMMARY OF INVENTION

The present invention provides the following solutions.

One aspect of the present invention is directed to a microscope system including: a microscope that includes an optical member disposed in an optical path so as to be switchable and that acquires an image of a specimen; and a magnification-estimation unit that, on the basis of a pre-switching optical magnification of the optical member in the microscope, estimates a post-switching optical magnification, wherein while scaling one of a pre-switching image acquired before switching of the optical member and a post-switching image acquired after switching of the optical member to a plurality of search images respectively corresponding to a plurality of search magnifications, the magnification-estimation unit calculates a degree of similarity to the other image and estimates the post-switching optical magnification from the search magnification when the calculated degree of similarity becomes the maximum.

In addition, another aspect of the present invention is directed to a method for estimating a microscope magnification, including: a degree-of-similarity calculation step of, while scaling one of a pre-switching image acquired before switching of an optical member disposed in an optical path of a microscope so as to be switchable and a post-switching image acquired after switching of the optical member to a plurality of search images respectively corresponding to a plurality of search magnifications, calculating a degree of similarity to the other image; and a post-switching-magnification estimation step of calculating a post-switching optical magnification from the search magnification achieved when the degree of similarity calculated in the degree-of-similarity calculation step becomes the maximum.

DESCRIPTION OF EMBODIMENTS

A microscope system 100 according to one embodiment of the present invention will now be described with reference to the drawings.

Figure 1:
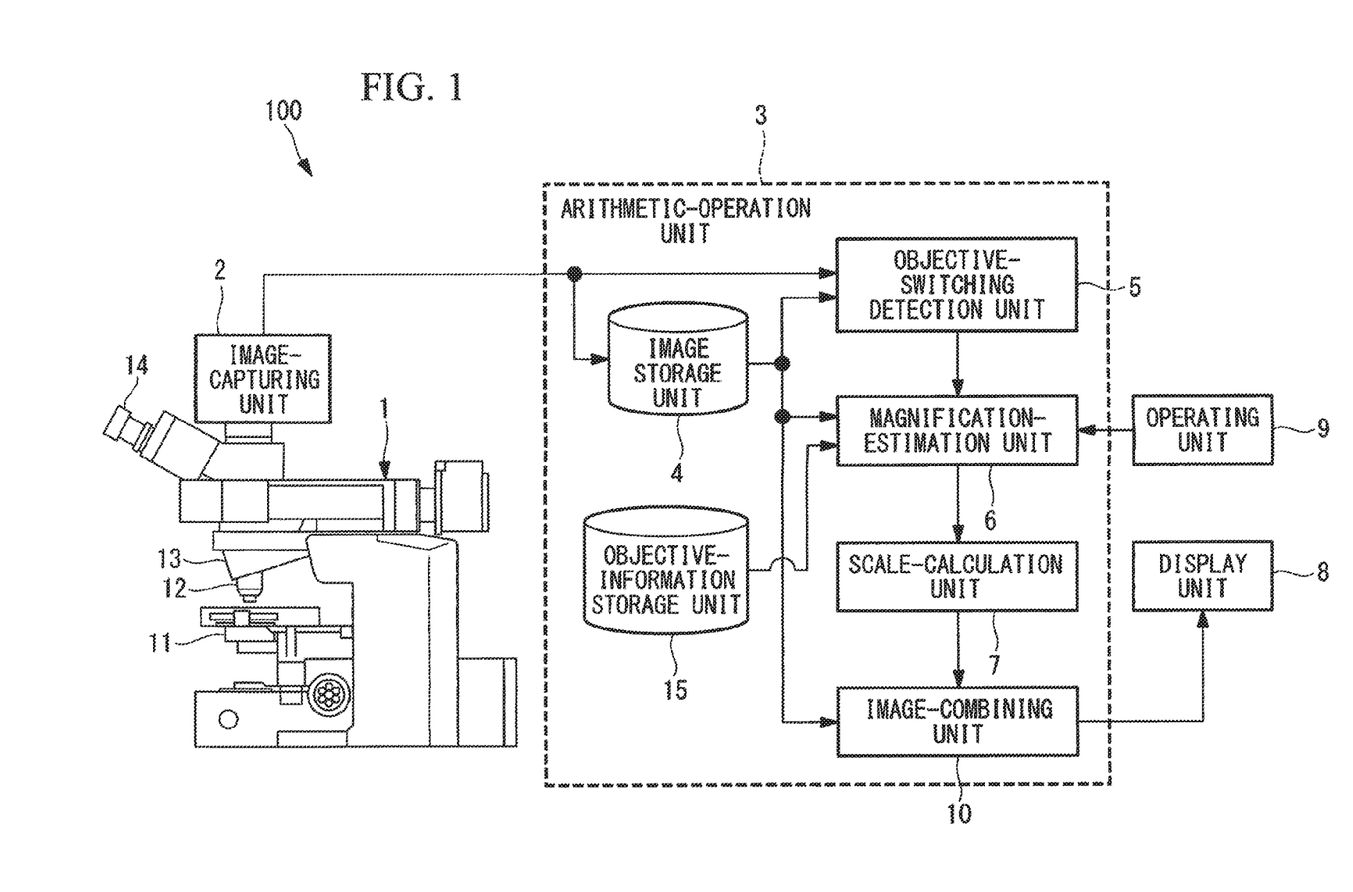
FIG. 1 is an overall schematic diagram of a microscope system according to one embodiment of the present invention.

As shown in FIG. 1, the microscope system 100 according to this embodiment includes a microscope 1, an arithmetic-operation unit 3, an operating unit 9, and a display unit 8.

The microscope 1 includes: a stage 11 on which a specimen is mounted and that is movable in three-dimensional directions; objective lenses 12 for collecting light from the specimen; a revolver 13 for holding the two or more objective lenses 12 so that they are exchangeable; an eyepiece 14 for observing an observation image of the specimen with an unaided eye; and an image-capturing unit (camera for microscope) 2 for acquiring the observation image of the specimen. This embodiment describes an example case in which the objective lenses 12 are the only optical members for determining the optical magnification of the microscope 1, and there are four types of the objective lenses 12, namely, ×4, ×10, ×20, and ×40, held on the revolver 13.

The arithmetic-operation unit 3 is a calculation unit that uses, for example, a general-purpose personal computer, a workstation, a built-in processor, or an FPGA (Field Programmable Gate Array).

The arithmetic-operation unit 3 includes: an image storage unit 4 for storing an image of each frame acquired by the image-capturing unit 2; an objective-switching detection unit (switching detection unit) 5 for detecting the switching among the objective lenses (optical members) 12 with the revolver 13; a magnification-estimation unit 6 that estimates the post-switching optical magnification when the switching among the objective lenses 12 is detected by the objective-switching detection unit 5; a scale-calculation unit 7 for calculating a scale on the basis of the optical magnification estimated by the magnification-estimation unit 6; and an image-combining unit 10 for generating a composite image having the scale calculated by the scale-calculation unit 7 superimposed on the latest image stored in the image storage unit 4.

The arithmetic-operation unit 3 also includes an objective-information storage unit (magnification-information retaining unit) 15 for storing the information about the magnifications of all the objective lenses 12 provided in the microscope 1.

The display unit 8 is configured to display an image combined by the image-combining unit 10.

The objective-switching detection unit 5 is configured to detect that the objective lens 12 has been switched on the basis of a changeover time in images composed of a series of frames acquired by the image-capturing unit 2 in the same manner as in, for example, Patent Literature 1.

The magnification-estimation unit 6 is configured to, as soon as the switching among the objectives is detected by the objective-switching detection unit 5, acquire one pre-detection image and one post-detection image stored in the image storage unit 4.

More specifically, the objective-switching detection unit 5 outputs the frame number at the start of switching and the frame number at the end of switching among the objective lenses 12, so that the magnification-estimation unit 6 acquires, from the image storage unit 4, the two images corresponding to those two frame numbers.

Next, a method for estimating a magnification using the microscope system 100 according to this embodiment will be described.

Figure 2:
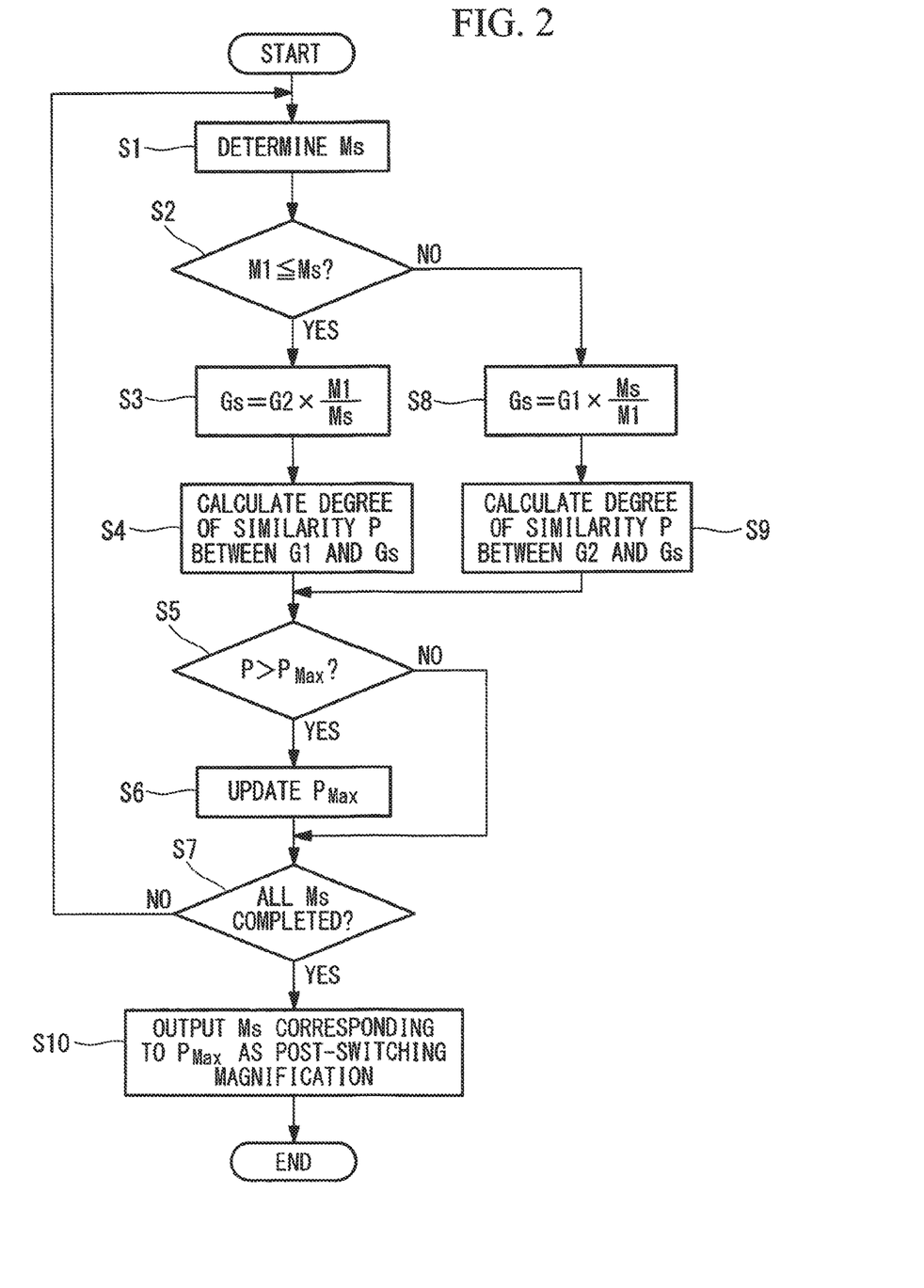
FIG. 2 is a flowchart depicting a procedure for estimating a post-switching magnification with a magnification-estimation unit of the microscope system in FIG. 1.

The magnification-estimation unit 6 is configured to estimate a post-switching magnification according to the flowchart shown in FIG. 2.

The method will be described by way of an example where the magnification of the objective lens 12 has been switched, for example, from ×10 to ×20 through the operation of the revolver 13.

More specifically, it is assumed that a pre-switching magnification is M1=10 (known) and a post-switching magnification is M2=20 (unknown).

On the basis of the information about the magnifications of the objective lenses 12 stored in the objective-information storage unit 15, the magnification-estimation unit 6 performs processing for possible combinations of optical magnifications of all the objective lenses 12 provided in the microscope 1.

More specifically, a search magnification Ms is first determined (step S1). This embodiment assumes that search is made from a high magnification towards a low magnification, and therefore, ×40, the highest of the possible optical magnifications, is selected as the search magnification Ms.

Figure 3:
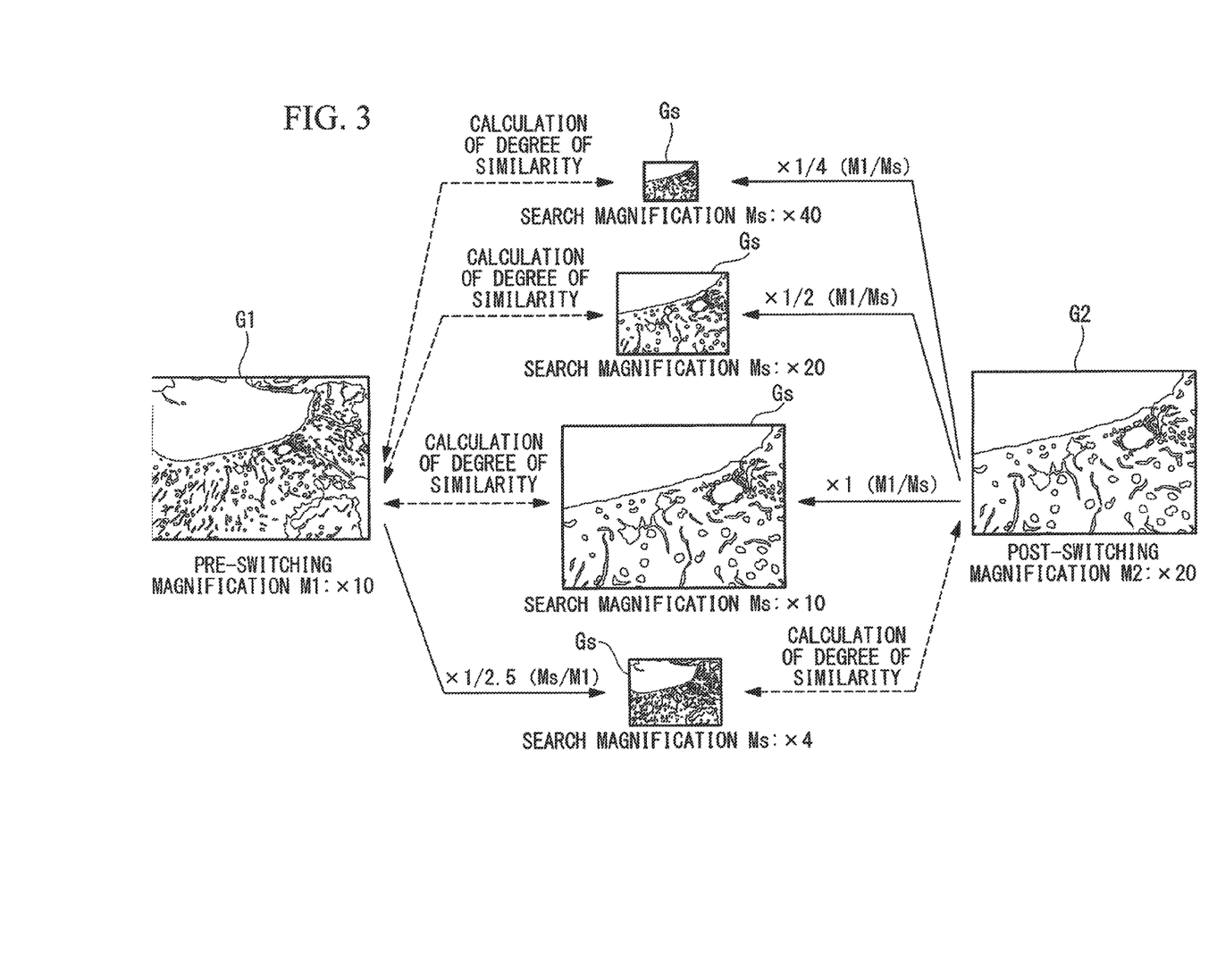
FIG. 3 is a diagram depicting the generation of search images and the calculation of degrees of similarity according to the flowchart in FIG. 2.

Then, the search magnification Ms is compared with the pre-switching magnification M1 (step S2). If the search magnification Ms is equal to or higher than the pre-switching magnification M1, a post-switching image G2 is multiplied by M1/Ms. Because M1=10<Ms=40 in the example described above, the post-switching image G2 is multiplied by M1/Ms=1/4, and a search image Gs formed by scaling the post-switching image G2 to 1/4 is generated as shown in FIG. 3 (search-image generation step S3).

For scaling, a known interpolation method, such as the nearest neighbor, bilinear, or bicubic method, is used.

Next, a degree of similarity P between the search image Gs formed by scaling the post-switching image G2 and the pre-switching image G1 is calculated (degree-of-similarity calculation step S4).

The degree of similarity P is calculated by carrying out template matching of the pre-switching image G1 with the search image Gs, formed by scaling the post-switching image G2, as a template. For template matching, calculation of the degree of difference, typified by SAD (Sum of Absolute Difference) or SSD (Sum of Squared Difference), or calculation of the degree of correlation, typified by NCC (Normalized Cross-Correlation) or ZNCC (Zero-mean Normalized Cross-Correlation), may be used as known art. In order to treat degrees of difference as degrees of similarity, lower degrees of difference may be treated as higher degrees of similarity. Known art called the phase restriction correlation method, which is based on correlation of spatial frequencies, can also be used.

If there is a degree of similarity that has already been calculated and stored, in addition to the newly calculated degree of similarity P, then it is compared with that stored degree of similarity Pmax in terms of the magnitude relationship (step S5), and if the newly calculated degree of similarity P is larger, the stored degree of similarity Pmax is updated, and then the corresponding search magnification Ms is stored in association with the degree of similarity Pmax (step S6).

Then, it is determined whether the degrees of similarity P for all the search magnifications Ms have been calculated (step S7), and if the calculation has not been completed, the control returns to step S1, where the next possible search magnification Ms is determined and the next step S2 is executed.

For the next possible search magnifications Ms=20 and 10, the same processing as with the search magnification Ms=40 is carried out in step S2, and hence, the processing from step S3 to step S6 is repeated.

On the other hand, if the search magnification Ms is smaller than the pre-switching magnification M1, i.e., if the search magnification Ms=4, as a result of the comparison in step S2, then a search image Gs formed by scaling the pre-switching image G1 to Ms/M1=4/10=1/2.5 is generated, as shown in FIG. 3 (search-image generation step S8).

Then, the degree of similarity P between the search image Gs, formed by scaling the pre-switching image G1, and the post-switching image G2 is calculated (degree-of-similarity calculation step S9).

More specifically, the degree of similarity P is calculated by carrying out template matching of the post-switching image G2 with the search image Gs, formed by scaling the pre-switching image G1, as a template, and then step S5 is executed.

Figure 5:
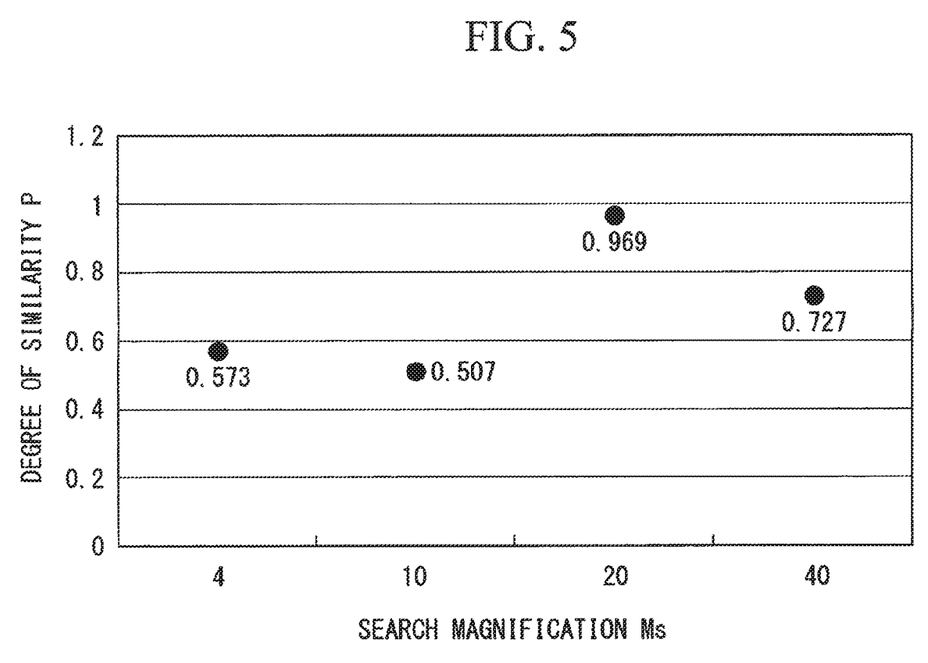
FIG. 5 is a diagram depicting the relationship between the degrees of similarity calculated in accordance with the estimating procedure in FIG. 2 and search magnifications.

When the degrees of similarity P for all possible search magnifications Ms have been calculated in this manner, a result like that shown in FIG. 5 is obtained. In the above-described example, the degree of similarity P is the maximum when the search magnification Ms=20. Note that the degrees of similarity P as shown in FIG. 5 are a result of template matching based on ZNCC, with the values ranging from 0.0 to 1.0, where 1.0 indicates the highest degree of similarity, i.e., complete matching.

Then, if it is determined that the degrees of similarity P for all search magnifications Ms have been calculated in step S7, the search magnification Ms=20 corresponding to the stored degree of similarity Pmax is output as the post-switching magnification M2 (post-switching-magnification estimation step S10). In this manner, the post-switching magnification M2 can be estimated with high accuracy.

Figure 4:
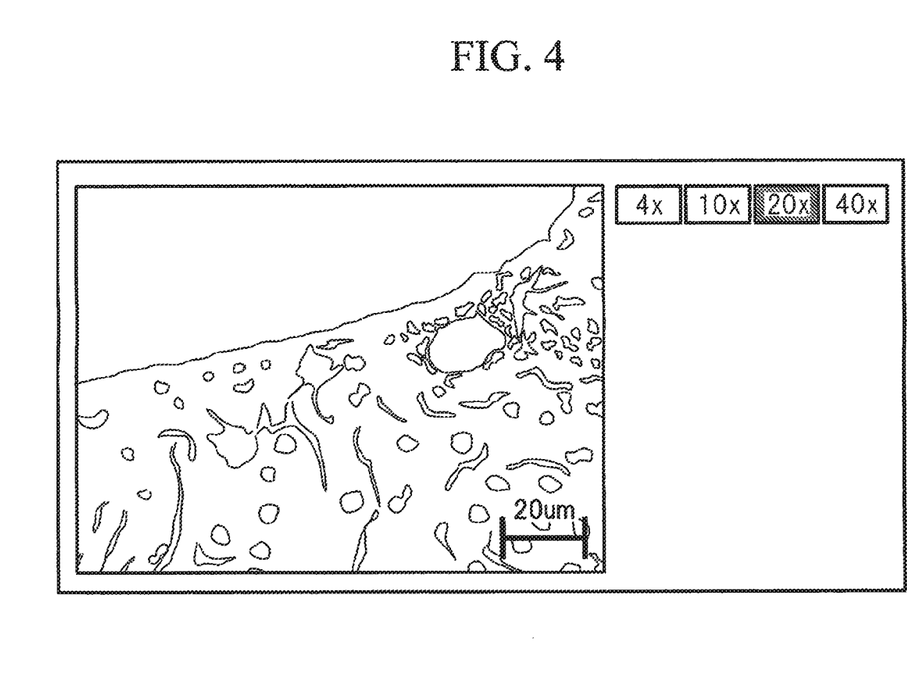
FIG. 4 is a diagram depicting an example image in which a post-switching magnification estimated with the microscope system in FIG. 1 is displayed with a scale.

If an estimated value of the post-switching magnification M2 is output from the magnification-estimation unit 6, a scale is calculated in the scale-calculation unit 7, and then the calculated scale is superimposed on the latest image in the image-combining unit 10 and is displayed on the display unit 8, as shown in FIG. 4. Thus, there is an advantage in that as a result of the superimposed image being displayed on the display unit 8, the user is relieved of a burdensome operation because he/she does not need to enter a new magnification.

In FIG. 4, the post-switching magnification is displayed on the display unit 8 so as to be perceivable. In the example of FIG. 4, the magnification information for each of the objective lenses 12 is displayed in the form of a button, in which the estimated post-switching magnification is displayed in the form of a depressed button, distinctively from the other magnifications.

The operating unit 9 is used for the user to set an optical magnification; it is used for the user to set a correct optical magnification in case the magnification-estimation unit 6 fails to estimate an optical magnification. For example, the user may be allowed to set a correct magnification by depressing a button in FIG. 4.

Thus, the microscope system 100 and the method for estimating a magnification of the microscope 1 according to this embodiment afford an advantage in that the post-switching magnification of the objective lens 12 can be estimated with high accuracy, without adding a special device like a code revolver, by processing an image acquired by the image-capturing unit 2 of the microscope 1.

Note that in this embodiment, the magnifications that are possible with the objective lenses 12 are stored in the objective-information storage unit 15 so that the magnification-estimation unit 6 estimates the post-switching magnification by switching only to the magnifications stored in the objective-information storage unit 15, thereby allowing the amount of calculation of the degrees of similarity to be minimized. Alternatively, the search magnification may be changed in prescribed steps within a prescribed range, thereby calculating the degrees of similarity.

In addition, although this embodiment has been described by way of an example where the optical magnification of the microscope 1 is changed only via the objective lenses 12 provided so as to be switchable with the revolver 13, it can also be easily applied to an example where the magnification is switched with another optical member, like a variable power mechanism.

As a result, the above-described embodiment leads to the following aspects.

One aspect of the present invention is directed to a microscope system including: a microscope that includes an optical member disposed in an optical path so as to be switchable and that acquires an image of a specimen; and a magnification-estimation unit that, on the basis of a pre-switching optical magnification of the optical member in the microscope, estimates a post-switching optical magnification, wherein while scaling one of a pre-switching image acquired before switching of the optical member and a post-switching image acquired after switching of the optical member to a plurality of search images respectively corresponding to a plurality of search magnifications, the magnification-estimation unit calculates a degree of similarity to the other image and estimates the post-switching optical magnification from the search magnification when the calculated degree of similarity becomes the maximum.

According to this aspect, the pre-switching image of the specimen is acquired by placing a predetermined optical member in the optical path of the microscope and acquiring an image of the specimen at a predetermined optical magnification. It is assumed that the optical magnification of the microscope at this time is known. Next, when the optical member is switched, the optical magnification of the microscope changes according to the optical member after the switching, and the magnification of the post-switching image obtained by acquiring an image of the specimen changes. The acquired pre-switching image and post-switching image are sent to the magnification-estimation unit, and while one of the images is being scaled to the plurality of search images respectively corresponding to the plurality of search magnifications, the degree of similarity to the other image is calculated.

Since the pre-switching image and the post-switching image have a relationship in which a reduced version of one of the images constitutes a part of the other image, the degree of similarity sharply increases at a certain magnification in the course of comparison while the magnification of the one of the images is being changed. Therefore, the post-switching magnification can be estimated easily and with high accuracy, without having to provide a special device like a code revolver, from the search magnification when the degree of similarity becomes the maximum.

In the above-described aspect, the magnification-estimation unit may sequentially set a search magnification and calculate the degree of similarity by scaling the post-switching image on the basis of the ratio of the pre-switching optical magnification to the search magnification if the set search magnification is equal to or larger than the pre-switching optical magnification or by scaling the pre-switching image on the basis of the ratio of the search magnification to the pre-switching optical magnification if the search magnification is smaller than the pre-switching optical magnification.

According to this aspect, if the set search magnification is equal to or larger than the known optical magnification before switching, the post-switching image is scaled so as to be reduced at the ratio between the magnifications to calculate the degree of similarity between the pre-switching image and the scaled post-switching image, or if the search magnification is smaller than the known optical magnification before switching, the pre-switching image is scaled so as to be reduced at the above-described magnification to calculate the degree of similarity between the post-switching image and the scaled pre-switching image.

Furthermore, in the above-described aspect, a switching detection unit for detecting switching of the optical member may be provided, wherein the magnification-estimation unit may estimate the post-switching optical magnification when switching of the optical member is detected by the switching detection unit.

By doing so, since the magnification-estimation unit estimates an optical magnification when switching of the optical member is detected by the switching detection unit, the post-switching optical magnification can be estimated as appropriate at the time of a possible change in magnification.

Furthermore, in the above-described aspect, a magnification-information retaining unit for retaining magnification information that can be employed by the optical member provided in the microscope may be provided, wherein the magnification-estimation unit may determine the search magnification to be changed when estimating the post-switching optical magnification on the basis of the magnification information retained in the magnification-information retaining unit.

By doing so, since the magnification can be changed only for the magnification information retained in the magnification-information retaining unit, the post-switching optical magnification can be estimated efficiently.

In addition, another aspect of the present invention provides a method for estimating a microscope magnification, including: a degree-of-similarity calculation step of, while scaling one of a pre-switching image acquired before switching of an optical member disposed in an optical path of a microscope so as to be switchable and a post-switching image acquired after switching of the optical member to a plurality of search images respectively corresponding to a plurality of search magnifications, calculating a degree of similarity to the other image; and a post-switching-magnification estimation step of calculating a post-switching optical magnification from the search magnification achieved when the degree of similarity calculated in the degree-of-similarity calculation step becomes the maximum.

According to the present invention, there is an advantage in that the magnification after an optical member, such as an objective lens, has been switched can be estimated without providing a special device, like a code revolver.

REFERENCE SIGNS LIST

1 Microscope
5 Objective-switching detection unit (switching detection unit)
6 Magnification-estimation unit
100 Microscope system
S4, S9 Degree-of-similarity calculation step
S10 Post-switching-magnification estimation step

The invention claimed is:

1. A microscope system comprising:
   a microscope comprising
      at least a first optical member having a known pre-switching magnification and a second optical member having an unknown post-switching magnification; and
      an image sensor configured to acquire a pre-switching image based on an observation image formed by the first optical member and to acquire a post-switching image based on an observation image formed by the second optical member; and
   a processor comprising hardware, wherein the processor is configured to perform an estimation process comprising:
      determine different search magnifications;
      for each of the different search magnifications:
         determine a relationship between the pre-switching magnification and the each of the different search magnifications; and
         based on the relationship determined, perform one of:
            a first process comprising:
               generate a search image by scaling the post-switching image based on the relationship between the pre-switching magnification and the each of the different search magnifications; and
               calculate a degree of similarity, associated with the each of the different search magnifications, between the pre-switching image and the search image; and
            a second process comprising:
               generate the search image by scaling the pre-switching image based on the relationship between the pre-switching magnification and the each of the different search magnifications: and
               calculate the degree of similarity between the post switching image and the search image; and
      select one of the different search magnifications having the degree of similarity that is a maximum amongst the degrees of similarities calculated, as an estimate of the unknown post-switching magnification.

2. The microscope system according to claim 1,
   wherein the processor is configured to:
      determine whether the relationship between the pre-switching magnification and the each of the different search magnifications is:
         a first relationship where the each of the search magnifications is equal to or larger than the pre-switching magnification; or
         a second relationship where the each of the search magnifications is less than the pre-switching magnification;
      based on the relationship determined being the first relationship, perform the first process comprising:
         generate the search image by scaling the post-switching image based on a ratio of the pre-switching magnification to the each of the search magnifications; and
         calculate the degree of similarity between the pre-switching image and the search image; and
      based on the relationship determined being the second relationship, perform the second process comprising:
         generate the search image by scaling the pre-switching image based on a ratio of the each of the search magnifications to the pre-switching magnification; and
         calculate the degree of similarity between the post-switching image and the search image.

3. The microscope system according to claim 1, further comprising:
   wherein the processor is configured to:
      detect switching from the fist optical member to the second optical member; and
      in response to detecting the switching from the first optical member to the second optical member, perform the estimation process.

4. The microscope system according to claim 1,
   wherein the processor is configured to determine the different search magnification from a predetermined set of different search magnifications.

5. A method for estimating an unknown post-switching magnification of a microscope comprising:
   at least a first optical member having a known pre-switching magnification and a second optical member having the unknown post-switching magnification; and
   an image sensor configured to acquire a pre-switching image based on an observation image formed by the first optical member and to acquire a post-switching image based on an observation image formed by the second optical member,
   wherein the method comprises:
      determining different search magnifications;
      for each of the different search magnifications:
         determining a relationship between the pre-switching magnification and the each of the different search magnifications; and
         based on the relationship determined, performing one of:
            a first process comprising:
               generating a search image by scaling the post-switching image based on the relationship between the pre-switching magnification and the each of the different search magnifications; and
               calculating a degree of similarity, associated with the each of the different search magnifications, between the pre-switching image and the search image; and a second process comprising:
   generating the search image by scaling the pre-switching image based on the relationship between the pre-switching magnification and the each of the different search magnifications; and
   calculating a degree of similarity, between the post switching image and the search image; and
selecting one of the different search magnification having the degree of similarity that is a maximum amongst the degrees of similarities calculated, as an estimate of the unknown posts-switching magnification.

6. A system for estimating an unknown post-switching magnification of a microscope comprising:
   at least a first optical member having a known pre-switching magnification and a second optical member having an unknown post-switching magnification; and
   an image sensor configured to acquire a pre-switching image based on an observation image formed by the first optical member and to acquire a post-switching-triage based on an observation image formed by the second optical member, wherein the system comprises a processor comprising hardware, wherein the processor is configured to:
   determine different search magnifications;
   for each of the different search magnifications:
      determine a relationship between the pre-switching magnification and the each of the different search magnifications; and
   based on the relationship determined, perform one of:
      a first process comprising:
         generate a search image by scaling the post-switching image based on the relationship between the pre-switching magnification and the each of the different search magnifications; and
         calculate a degree of similarity, associated with the each of the different search magnifications, between the pre-switching image and the search image; and
      a second process comprising:
         generate the search image by scaling the pre-switching image based on the relationship between the pre-switching magnification and the each of the different search magnifications; and
         calculate the degree of similarity between the post switching image and the search image; and
   select one of the different search magnifications having the degree of similarity that is a maximum amongst the degrees of similarities calculated, as an estimate of the unknown post-switching magnification.

* * * * *